(12) United States Patent
Cox et al.

(10) Patent No.: US 7,158,548 B2
(45) Date of Patent: Jan. 2, 2007

(54) LASER CAVITY

(75) Inventors: Alan Cox, Stockport (GB); Lawrie Gloster, Stockport (GB); Steve Lane, Manchester (GB)

(73) Assignee: Laser Quantum Ltd., Stockport (GB)

( * ) Notice: Subject to any disclaimer, the term of this patent is extended or adjusted under 35 U.S.C. 154(b) by 334 days.

(21) Appl. No.: 10/282,745

(22) Filed: Oct. 29, 2002

(65) Prior Publication Data

US 2003/0086466 A1 May 8, 2003

(30) Foreign Application Priority Data

Oct. 30, 2001 (GB) ................................ 0125915.9

(51) Int. Cl.
*H01S 3/081* (2006.01)
*H01S 3/10* (2006.01)

(52) U.S. Cl. ............................ 372/22; 372/20; 372/21; 372/93

(58) Field of Classification Search ............ 372/20–22, 372/25, 92–93, 98
See application file for complete search history.

(56) References Cited

U.S. PATENT DOCUMENTS

| | | | | | |
|---|---|---|---|---|---|
| 4,544,274 A | * | 10/1985 | Cremers et al. | ............. | 356/436 |
| 4,841,528 A | * | 6/1989 | Sipes et al. | ..................... | 372/22 |
| 4,914,664 A | * | 4/1990 | Woodward | .................... | 372/20 |
| 5,007,059 A | * | 4/1991 | Keller et al. | .................. | 372/18 |
| 5,020,073 A | * | 5/1991 | Alfrey et al. | ............... | 372/105 |
| 5,084,884 A | * | 1/1992 | Terada | .................... | 372/29.022 |
| 5,164,947 A | * | 11/1992 | Lukas et al. | ................... | 372/22 |
| 5,231,641 A | * | 7/1993 | Ortiz | ............................. | 372/21 |
| 5,351,121 A | * | 9/1994 | Baer et al. | .................. | 356/301 |
| 5,388,112 A | * | 2/1995 | Esterowitz et al. | ............ | 372/20 |
| 5,432,610 A | * | 7/1995 | King et al. | .................. | 356/432 |
| 5,619,517 A | * | 4/1997 | Dixon | ........................... | 372/21 |
| 5,721,748 A | * | 2/1998 | Injeyan et al. | .................. | 372/3 |
| 5,809,048 A | * | 9/1998 | Shichijyo et al. | ............. | 372/32 |
| 5,905,748 A | | 5/1999 | Xie | | |
| 5,966,391 A | * | 10/1999 | Zediker et al. | ................ | 372/22 |
| 5,991,318 A | * | 11/1999 | Caprara et al. | ................ | 372/22 |
| 6,031,854 A | * | 2/2000 | Ming | ........................... | 372/22 |
| 6,088,379 A | * | 7/2000 | Owa et al. | .................... | 372/97 |
| 6,097,742 A | * | 8/2000 | Caprara et al. | ................ | 372/22 |
| 6,130,900 A | * | 10/2000 | Black et al. | ................... | 372/25 |
| 6,141,369 A | | 10/2000 | Seelert et al. | | |
| 6,154,472 A | * | 11/2000 | MacKinnon et al. | ........... | 372/22 |
| 6,198,756 B1 | * | 3/2001 | Caprara et al. | ................ | 372/22 |
| 6,233,260 B1 | * | 5/2001 | Makio et al. | ................... | 372/22 |

(Continued)

FOREIGN PATENT DOCUMENTS

GB 2 254 483 A 10/1992

*Primary Examiner*—James Menefee
*Assistant Examiner*—Phillip Nguyen
(74) *Attorney, Agent, or Firm*—Woodard, Emhardt, Moriarty, McNett & Henry LLP

(57) ABSTRACT

A laser cavity comprising a gain medium and first and second end mirrors, wherein the laser cavity further comprises a birefringent material and a mirror arranged to fold light propagating within the laser cavity through a predetermined angle, wherein the predetermined angle is selected such that the reflectivity of the fold mirror is polarisation dependent, and the birefringence of the birefringent material co-operates with the polarisation dependent reflectivity of the fold mirror to form a Lyott filter which suppresses oscillation of unwanted laser modes. The invention allows the construction of a low loss, high finesse laser cavity with longitudinal mode control. The need for introduction of an extra polarisation selection element to form a Lyott filter is removed.

32 Claims, 3 Drawing Sheets

U.S. PATENT DOCUMENTS 6,295,305 B1 * 9/2001 Matsumoto et al. .......... 372/19

6,373,868 B1 * 4/2002 Zhang ......................... 372/19

* cited by examiner

LASER CAVITY

The present application claims priority to British Patent Application No. 0125915.9 filed Oct. 30, 2001, which is incorporated herein by reference.

The present invention relates to a laser cavity.

Over the last decade, diode pumped solid state laser systems have been becoming increasingly popular in many industrial applications. They have, in many cases, been replacing both lamp pumped and gas discharge laser systems due to their compactness and efficiency.

Most diode pumped solid state laser systems have a fundamental wavelength in the infrared. Whilst this is suitable for many applications, many others require a shorter wavelength that is visible. Second harmonic generation (SHG) is often used to generate the visible shorter wavelength. Second harmonic generation is a nonlinear process that can be used to convert light of a given wavelength to light at the second harmonic of that wavelength (twice the frequency). Since SHG is a nonlinear process, a high intensity of light at the fundamental wavelength is necessary in order for the SHG to be efficient.

In continuous wave (CW) systems, it is often the case that the intensity of light at the fundamental wavelength outside of a laser cavity is not sufficient to provide efficient SHG. For this reason, SHG is often achieved by placing a SHG crystal inside the laser cavity (this is often referred to as intracavity frequency doubling). The intensity of the fundamental wavelength inside the laser cavity is typically a factor of 100 or more greater than that outside the laser cavity.

Locating the SHG crystal inside a laser cavity provides efficient SHG, but often results in an output which exhibits pronounced intensity fluctuations. This effect is well understood (T. Baer, 'Large-amplitude fluctuations due to longitudinal mode coupling in diode-pumped intracavity-doubled Nd:YAG lasers,' J. Opt. Soc. Am. B 3, 1175 (1986)) and arises from a coupling between spatial hole burning in the laser gain medium and a nonlinear output coupling (from the SHG crystal). This effect is often referred to as the 'green problem' since most lasers which include intracavity doubling emit green light.

It is an object of the present invention to provide a laser cavity which overcomes or mitigates the above disadvantage.

According to the invention there is provided a laser cavity comprising a gain medium and first and second end mirrors, wherein the laser cavity further comprises a birefringent material and a mirror arranged to fold light propagating within the laser cavity through a predetermined angle, wherein the predetermined angle is selected such that the reflectivity of the fold mirror is polarization dependent, and the birefringence of the birefringent material co-operates with the polarization dependent reflectivity of the fold mirror to form a Lyot filter which suppresses oscillation of unwanted laser modes.

The invention allows the construction of a low loss, high finesse laser cavity with longitudinal mode control. The need for introduction of an extra polarization selection element to form a Lyot filter is removed (the Lyot filter is formed by the fold mirror and a birefringent material).

Preferably, the reflectivity of the fold mirror is greater for s-polarized light than for p-polarized light.

Preferably, the gain medium is distanced away from the nearest end mirror by a sufficient distance that the laser is allowed to oscillate at or near to several transmission peaks of the Lyot filter.

If the gain medium is not distanced away from the end mirror, then oscillation of the laser for some of the transmission peaks of the Lyot filter will be suppressed.

Preferably, the distance between the gain medium and the nearest end mirror is greater than 5 mm.

Preferably, the distance between the gain medium and the nearest end mirror is less than 5 mm, but the majority of the effective gain provided by the gain medium is provided more than 5 mm away from the nearest end mirror.

Preferably, the laser cavity further comprises one or more optical wave plates arranged to change the polarization of the light at the fundamental wavelength of the laser cavity, and thereby control or reduce the effect of spatial hole burning within the gain medium.

Preferably, the end mirrors and the fold mirror are dielectric coated mirrors.

Preferably, the birefringent material is a type II phasematched frequency doubling crystal arranged to convert light at the fundamental wavelength of the laser to light at the second harmonic wavelength.

Preferably, the type II phasematched frequency doubling crystal is KTP.

Preferably, the birefringent material is a type I phasematched frequency doubling crystal with axes arranged at an angle relative to the polarization of light at the fundamental wavelength of the laser, such that the type I phasematched frequency doubling crystal can modify the polarization of the light at the fundamental wavelength of the laser and thereby form part of the Lyot filter.

Preferably, in addition to the birefringent material the laser cavity is provided with a separate type I phasematched frequency doubling crystal.

Preferably, the birefringent material is the gain medium.

Preferably, the type I phasematched frequency doubling crystal is LBO.

Preferably, the birefringent material and the gain medium are located in separate arms of the laser cavity.

Preferably, the fold mirror is substantially transmissive to light at the second harmonic wavelength.

Preferably, the gain medium is optically pumped using one or more semiconductor laser diodes.

Preferably, the gain medium is optically pumped from at least one end using two semiconductor diode lasers combined by use of a polarizing beamsplitter.

Preferably, the gain medium comprises a rare earth element doped into a crystal host.

Preferably, the gain medium comprises Neodynium doped into a crystal lattice.

Preferably, one or more of the mirrors is concave.

Preferably, the angle of incidence of light upon the fold mirror is greater than 20 degrees.

Preferably, the angle of incidence of light upon the fold mirror is 40 degrees or greater.

Preferably, the angle of incidence of light upon the fold mirror is 50 degrees or greater.

A specific embodiment of the invention will now be described by way of example only, with reference to the accompanying drawings, in which.

Figure 1:
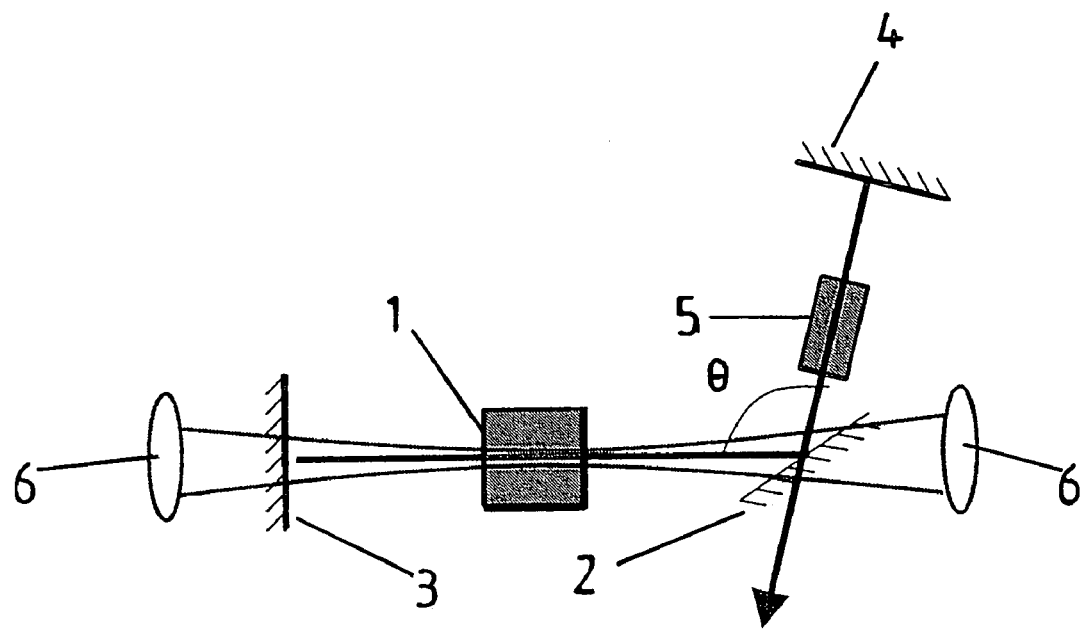
FIG. 1 is a schematic illustration of a laser cavity which embodies the invention.

Referring to FIG. 1, a laser cavity which embodies the invention comprises a Neodymium:YAG (Nd:YAG) gain medium 1, a fold mirror 2 arranged to reflect the laser mode such that it is folded by an angle θ as shown, and two end mirrors 3, 4. The cavity is provided with a KTP birefringent frequency doubling crystal 5. This is referred to as an intracavity frequency doubling crystal since it is located within the laser cavity. At least one mirror, preferably one or both of the end mirrors 3, 4 is concave to maintain a stable oscillating mode of the laser cavity.

End mirrors 3, 4 are highly reflecting at the fundamental wavelength of the Nd:YAG gain medium 1 (centred on 1064 nm), and in addition are highly reflecting at the corresponding second harmonic wavelength (centred on 532 nm). Fold mirror 2 is highly reflecting at the fundamental wavelength, but has low reflectivity at the second harmonic wavelength. The Nd:YAG gain medium 1 is pumped optically, using diode lasers 11 (see FIGS. 6 and 7) focussed by lenses 6, with sufficient intensity that laser oscillation at the fundamental wavelength occurs in the cavity. Laser oscillation at the fundamental wavelength is s-polarized (where the s-plane is perpendicular to the plane of the laser cavity, and the p-plane corresponds to the plane of the laser cavity).

The KTP crystal 5 is a type II phasematched frequency doubling crystal which has its axes oriented at roughly 45 degrees either side of the s-plane. A proportion of the s-polarized fundamental wavelength light which passes through the KTP crystal 5 (typically <1% per pass) is frequency doubled by the KTP crystal 5. In other words, the KTP crystal 5 converts light at the fundamental wavelength to light at the second harmonic of the fundamental wavelength (the second harmonic light is centred on 532 nm).

Since light at the fundamental wavelength is travelling in both directions through the KTP crystal 5, light at the second harmonic wavelength is generated in both directions. Second harmonic light generated in the direction of the fold mirror 2 passes through the fold mirror 2 and out of the laser cavity. Second harmonic light generated in the direction of the end mirror 4 is reflected back through the KTP crystal 5 to pass through the fold mirror 2 and out of the laser cavity. A small proportion of the second harmonic light will be reflected by the fold mirror 2, and will pass through the gain medium 1 to the end mirror 3. The end mirror 3 reflects the second harmonic light, thereby avoiding the possibility that the second harmonic light might damage the diode laser (not shown) used to optically pump the laser cavity.

In addition to providing frequency doubling, the KTP crystal 5 acts together with the fold mirror 2 to provide a Lyot filter. The fold mirror 2 is oriented at an angle of incidence .theta./2 of approximately 45 degrees. At this angle of incidence the loss suffered by p-polarized light at the fundamental wavelength is significantly greater that the loss suffered by s-polarized light at the fundamental wavelength. The fold mirror 2 is a dielectric coated mirror, and typically reflects s-polarized infrared light with a loss of <0.05%, and p-polarized infrared light with a loss of 1–3%. The magnitude of this polarizing effect can be modified by adjusting the angle of incidence .theta./2, or by using a mirror having a different dielectric coating. Whilst the loss suffered by p-polarized light is only a few percent, the difference between the losses suffered by the p-polarized light and the s-polarized light is sufficient to ensure that the laser oscillates in s-polarized modes only.

The majority of the s-polarized light at the fundamental wavelength is not frequency doubled by the KTP crystal, but instead passes from the KTP crystal at the fundamental wavelength (typically around 1% of the light is frequency doubled). As previously mentioned, the KTP crystal 5 is a type II phasematched frequency doubling crystal which has its axes oriented at roughly 45 degrees either side of the s-plane. This means that s-polarized light at the fundamental wavelength will have its polarization modified by the KTP crystal 5. There will be several wavelengths for which the s-polarization of the light is substantially unaffected, whereas all other wavelengths will experience some twist of polarization. Any twist of polarization will provide an increase component of p-polarized light, and this will incur loss at the fold mirror 2. Therefore, the KTP crystal 5 and the fold mirror 2 combine to form a Lyot filter which has a series of peaks of transmission. The laser cavity will preferentially oscillate with modes having wavelengths which are at or near to transmission peaks of the Lyot filter.

The polarization dependent reflectivity of the fold mirror 2 is chosen to provide just enough selection to the Lyot filter to suppress the unwanted modes, whilst not causing too great a loss to the laser due to inherent polarization distortion.

The use of the fold mirror 2 to provide polarization dependent loss is advantageous, as compared to the conventionally used Brewster plate, because it introduces much less loss into the cavity. This is particularly important when the cavity includes a frequency-doubling crystal 5, because the efficiency of the frequency doubling process relies upon a high cavity finesse, which in turn is dependent upon the cavity having a low loss. In a high finesse laser cavity, the intensity of light inside the cavity can be so high that loss caused by the introduction of a polarization selection element is unsatisfactory. Even an additional loss of 0.1%, for example due to the introduction of a Brewster plate into the cavity, may cause unacceptable deterioration of the finesse of the cavity. Ideally, most of the loss in the cavity should occur due to frequency conversion in the KTP crystal and hence lead to useful light output at the second harmonic frequency.

The dielectric coated fold mirror 2 is manufactured to provide high reflectivity of light for an angle of incidence of around 45 degrees. Mirrors of this type are readily available and are relatively inexpensive. The mirrors are specifically chosen to have a higher s-polarization reflectivity than p-polarization reflectivity. This property often arises as a result of s-polarized light generally being easier to reflect with low loss than p-polarized light.

A mirror arranged to reflect light at angles other than 45 degrees may be used as the fold mirror 2. In general, the reflectivity with regard to s-polarized light is easily made to be high at angles of incidence greater than 45 degrees, but the reflectivity of the p-polarized light is usually reduced, thereby enhancing the polarization selectivity. In contrast to this, the polarization selectivity is usually small for mirrors reflecting light at less than 20 degrees. At zero degrees there is in general no polarization selectivity.

The light af the second harmonic wavelength (created in the KTP crystal 5) does not have to travel through the laser gain medium 1 before leaving the cavity, since the KTP crystal 5 is located in the arm of the cavity than does not contain the gain medium 1. This means that the second harmonic light does not have its polarization affected by passage through the gain medium 1. If the gain medium is homogeneous such as YAG, the polarization of the second harmonic light could be affected by stress or thermal birefringence within the material. If the gain medium is naturally birefringent such as $YVO_4$, the polarization of the light may be twisted or distorted by passing through it. This is of special significance, because in type II phasematching the polarization of the second harmonic wavelength light is at 45 degrees to light at the fundamental wavelength, and hence at 45 degrees to the crystallographic axes of the gain medium. These problems are avoided by ensuring that the second harmonic light does not pass through the gain medium.

Conventionally, the gain medium is located adjacent the end mirror 3. However, in the illustrated embodiment of the invention the gain medium 1 is placed a significant distance from the end mirror 3. Moving the gain medium 1 away from the end mirror 3 has a beneficial effect on the spatial hole burning properties of the laser cavity.

Figure 2:
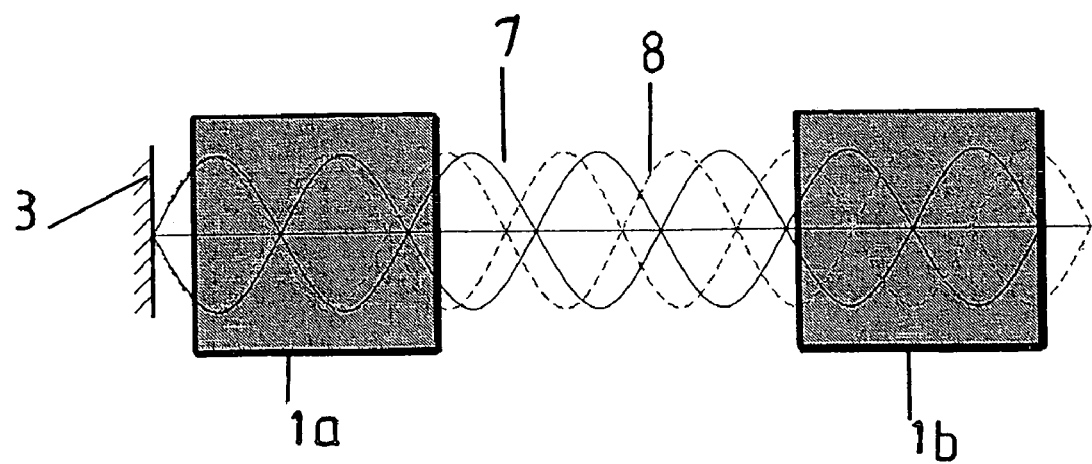
FIG. 2 is a schematic illustration of a laser gain medium and its position within the laser cavity.

In a conventional laser cavity which supports a standing wave, a node of the standing wave of the laser intensity is always found at each of the end mirrors for any given oscillating laser mode within the linear laser cavity. It follows that, if many modes exist with similar frequencies, they are all in-step at the laser end mirrors. FIG. 2 shows schematically the end mirror 3 and two standing waves of different wavelengths 7, 8. It can be seen that the standing waves 7, 8 gradually run out of phase with each other with increasing distance from the end mirror 3. If the gain medium is placed close to the back mirror, as shown by gain medium 1a, one dominant oscillating mode will remove much of the gain from other similar frequency modes despite the effect of spatial hole burning. This is because the modes are almost in step with each other within the gain medium and, therefore, share similar positions of their antinodes.

The effect of moving the gain medium away from the end mirror 3, is shown by gain medium 1b. Standing modes having similar wavelengths run out of step with each other, and each mode is responsible for spatial hole burning in different regions of the gain medium 1b. The result is that most of the gain available within the mode volume can be depleted, and that spatial hole burning caused by a given oscillating mode will only prevent oscillation of modes which have very similar wavelengths (these have similar spatial intensity distributions within the gain medium). Spatial hole burning will not affect modes whose wavelengths are sufficiently different that their spatial intensity distributions have run out of step at the gain medium.

Figure 3:
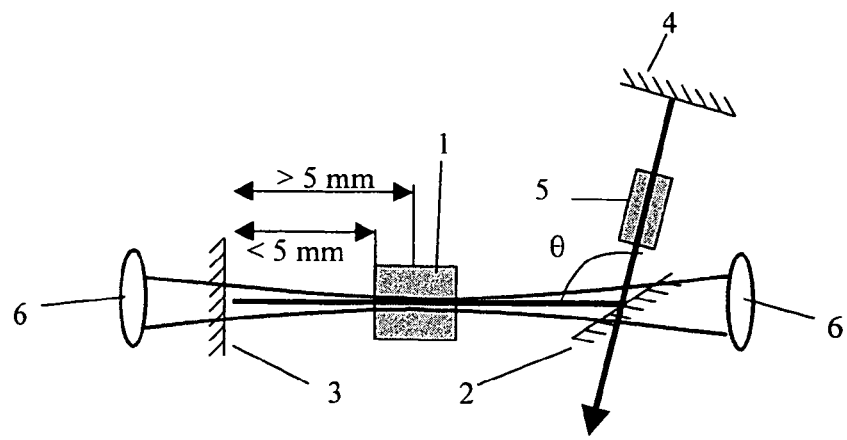
FIG. 3 is a schematic illustration of an alternative embodiment of the invention of FIG. 1 that shows various dimensions.

FIG. 2 shows the two longitudinal laser modes 7, 8 running out of step with each other as the distance from the end mirror 3 increases. Careful placement of the gain medium 1b away from the end mirror 3 is used to control the resulting longitudinal mode pattern of the laser. It has been found that ensuring that the distance between the gain medium 1b and the end mirror 3 is greater than approximately 5 mm will provide stable operation of the laser cavity. An illustration of such an embodiment is provided in FIG. 3. In general terms, the separation should be sufficient that adjacent modes of the laser cavity are prevented from oscillating but that other modes separated by many cavity mode spacings are allowed to oscillate. It is believed that the placement of the gain medium 1, in combination with the Lyot filter, allows one cavity mode to oscillate for each peak of the Lyot filter, causing a well controlled multimode operation with a mode profile consisting of 'single modes' spaced apart in frequency by the free spectral range of the Lyot filter. These modes are spaced some distance apart in terms of frequency, and consequently any interference between the modes will tend to be above around 100 kHz. In some instances more than one mode may oscillate in a peak of Lyot filter transmission.

It will be appreciated that in some instances the gain medium 1 may be quite long (for example a rod of Nd:YAG). Where this is the case the separation between the end of the gain medium 1 and the end mirror 3 may be reduced, provided that the gain medium has a long absorption length such that a substantial portion of the gain is provided by parts of the gain medium which are spaced away from the end mirror 3.

Through the combination of the Lyot filter formed by the fold mirror 2 and the KTP crystal 5, and the positioning of the gain medium 1 away from the end mirror 3, it is possible to control the longitudinal mode profile of the laser such that 'green noise' is only present at frequencies of a few hundred kilohertz and higher. The intensity noise at frequencies below a few hundred kilohertz is very low, rendering the laser useful for a wide range of applications without the need to force the laser to oscillate in a single mode.

Figure 6:
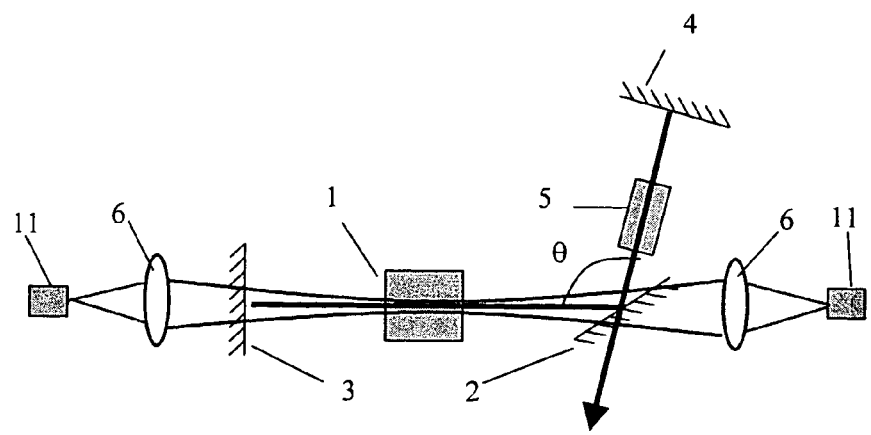
FIG. 6 is a schematic illustration of an alternative embodiment of the invention of FIG. 1 that includes a semiconductor laser diode.
Figure 7:
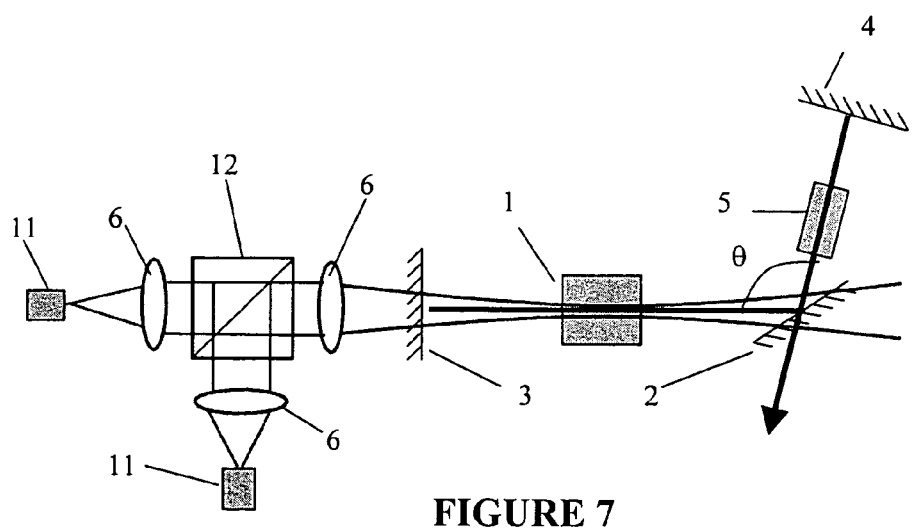
FIG. 7 is a schematic illustration of an alternative embodiment of the invention of FIG. 1 that includes two semiconductor laser diodes being combined by use of a beamsplitter.

As can be seen from FIGS. 6 and 7, diode lasers 11 can be used to pump the gain medium 1 from either or both ends. Up to four diode lasers 11 may be used to pump the gain medium 1, by combining the outputs of two pairs of diode lasers 11 using polarizing beam splitters 12 and directing the combined outputs through the end mirror 3 and fold mirror 2 in the manner shown.

Although the illustrated embodiment of the invention uses a KTP crystal, it will be appreciated that any type II phasematched frequency doubling crystal may be used.

Although the illustrated embodiment of the invention uses a Nd:YAG gain medium, it will be appreciated that any suitable gain medium may be used. Suitable gain mediums include, but are not limited to, $Nd:YVO_4$ or Nd:YLF.

The illustrated laser cavity controls the longitudinal mode profile of the laser in order to provide second harmonic light output with low intensity noise over frequency from DC to a few hundred Kilohertz. This makes the laser system suitable for many applications where low frequency noise has in the past presented a problem.

A type II phasematched second harmonic generation (SHG) birefringent crystal 5 such as KTP is used by the illustrated embodiment of the invention in order that the birefringent crystal which forms part of the Lyot filter also provides second harmonic generation.

Figure 5:
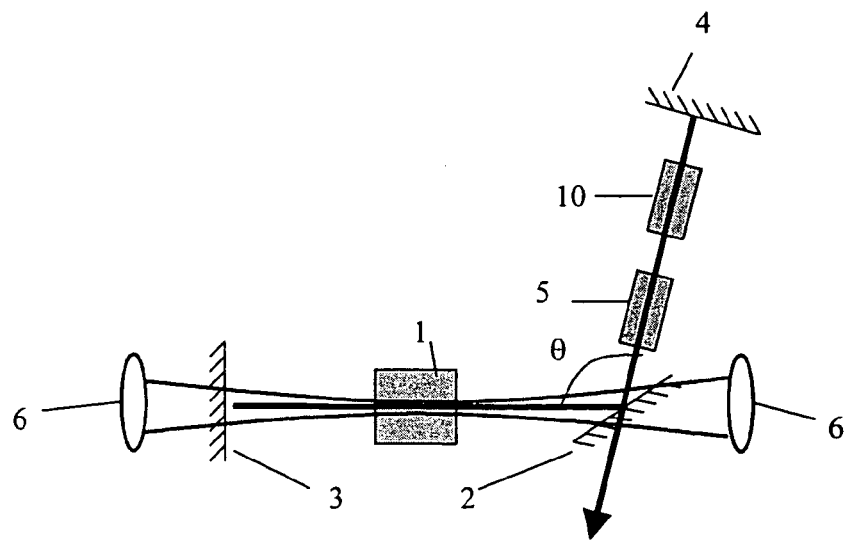
FIG. 5 is a schematic illustration of an alternative embodiment of the invention of FIG. 1 that includes an additional type I phasematched frequency doubling crystal.

Referring to FIG. 5, it will be appreciated that the invention may be implemented using a first birefringent crystal 10 to provide frequency doubling (type I phasematched), and a second separate birefringent crystal 5 used to form the Lyot filter. This will suffer from the disadvantage that losses within the cavity, caused by optical scatter within crystals and by reflection at the surfaces of the crystals, will be increased substantially. Suitable type I phasematched crystals are Potassium Niobate ($KNbO_3$) and Lithium-Triborate (LBO).

In an alternative embodiment of the invention, the laser cavity may be constructed with a type I phasematched second harmonic generation birefringent crystal oriented such that its crystallographic axes are not fully aligned with the polarization of light at the fundamental wavelength within the laser cavity. This would allow the polarization of the fundamental wavelength to be affected by the birefringence of the crystal. A disadvantage of this embodiment is that the efficiency of the frequency doubling provided by the birefringent crystal is compromised by the non-optimal alignment of its crystallographic axes.

Figure 8:
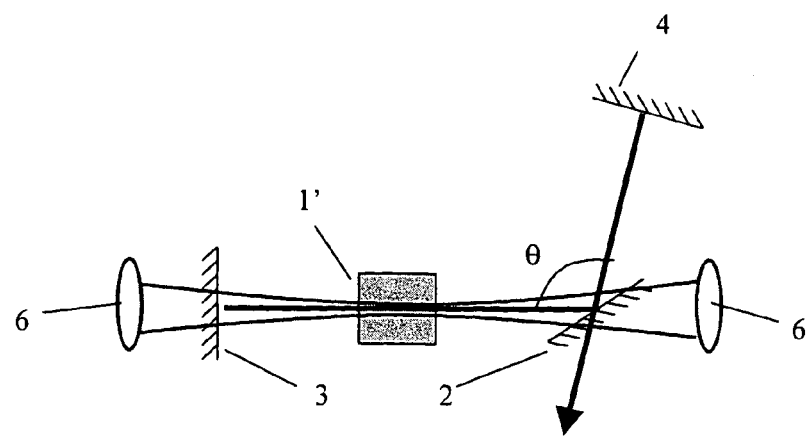
FIG. 8 is a schematic illustration of an alternative embodiment of the invention of FIG. 1 wherein the gain medium is the birefringent crystal with its crystallographic axes arranged at an angle relative to the polarization of light.

Depolarization of the s-polarized light may occur in the gain medium, which will often exhibit significant thermal birefringence due to the absorption of pump light, and which may be intrinsically birefringent. Referring to FIG. 8, the gain medium 1' could therefore be used to provide the birefringence required for the Lyot filter. This arrangement suffers from the disadvantage that the effect of the birefringence of the gain medium 1' on the laser mode is temperature dependent and cannot easily be controlled.

Figure 4:
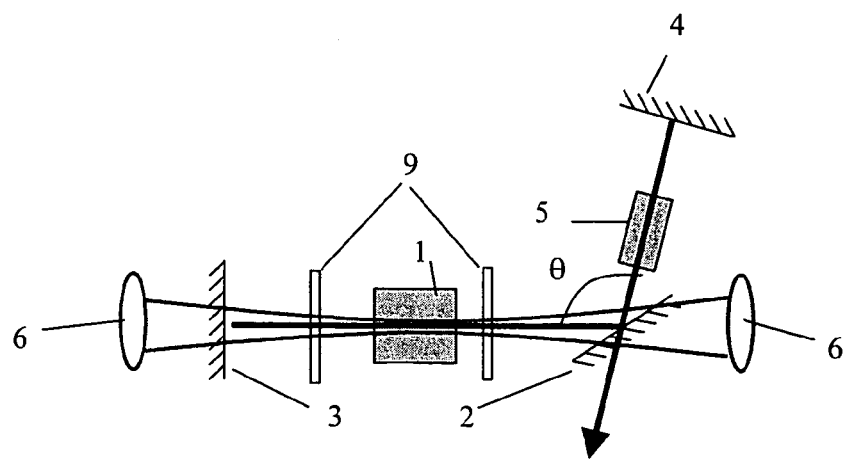
FIG. 4 is a schematic illustration of an alternative embodiment of the invention of FIG. 1 that includes optical waveplates.

Referring to FIG. 4, one or more optical wave plates 9 may be located in the laser cavity, the optical wave plates 9 being arranged to change the polarization of light at the fundamental wavelength of the laser cavity. This controls or reduces the effect of spatial hole burning within the gain medium. Using optical wave plates 9 in this manner may result in a laser that has a single longitudinal mode output. In this case, the distance between the gain medium and the back mirror is unimportant.

Although the described embodiment of the invention relates to light at 1064 nm which is frequency doubled to 532 nm, it will be appreciated that the invention may be implemented for any suitable wavelengths. For example, light generated at 946 nm by a Nd:YAG laser cavity may be frequency doubled to 473 nm using LBO. Alternatively, light generated at 914 nm by a Nd:YVO$_4$ laser may be frequency doubled to 457 nm using LBO. The LBO may be type I or type II phasematched. Other embodiments of the invention will be apparent to those skilled in the art.

The invention claimed is:

1. A laser cavity comprising a gain medium and first and second end mirrors, wherein the laser cavity further comprises a birefringent material and a fold mirror arranged to fold light propagating within the laser cavity through a predetermined angle, wherein the predetermined angle is selected such that the reflectivity of the fold mirror is polarization dependent, and the birefringence of the birefringent material co-operates with the polarization dependent reflectivity of the fold mirror to form a Lyot filter which suppresses oscillation of unwanted laser modes, and wherein the majority of the effective gain provided by the gain medium is provided more than 5 mm away from the nearest end mirror.

2. A laser cavity according to claim 1, wherein the reflectivity of the fold mirror is greater for s-polarized light than for p-polarized light.

3. A laser cavity according to claim 1, wherein the gain medium is distanced away from the nearest end mirror by a sufficient distance that the laser is allowed to oscillate at or near to several transmission peaks of the Lyot filter.

4. A laser cavity according to claim 3, wherein the distance between the gain medium and the nearest end mirror is greater than 5 mm.

5. A laser cavity according to claim 3, wherein the distance between the gain medium and the nearest end mirror is less than 5 mm.

6. A laser cavity according to claim 1, wherein the end mirrors and the fold mirror are dielectric coated mirrors.

7. A laser cavity according to claim 1, wherein the birefringent material is a type II phasematched frequency doubling crystal arranged to convert light at the fundamental wavelength of the laser to light at the second harmonic wavelength.

8. A laser cavity according to claim 7, wherein the type II phasematched frequency doubling crystal is KTP.

9. A laser cavity according to claim 1, wherein the birefringent material is a type I phasematched frequency doubling crystal with axes arranged at an angle relative to the polarization of light at the fundamental wavelength of the laser, such that the type I phasematched frequency doubling crystal modifies the polarization of the light at the fundamental wavelength of the laser and thereby form part of the Lyot filter.

10. A laser cavity according to claim 1, wherein in addition to the birefringent material the laser cavity is provided with a separate type I phasematched frequency doubling crystal.

11. A laser cavity according to claim 9, wherein the type I phasematched frequency doubling crystal is LBO.

12. A laser cavity according to claim 1, wherein the birefringent material and the gain medium are located in separate arms of the laser cavity.

13. A laser cavity according to claim 1, wherein the fold mirror is substantially transmissive to light at the second harmonic wavelength.

14. A laser cavity according to claim 1, wherein the gain medium is optically pumped using one or more semiconductor laser diodes.

15. A laser cavity according to claim 14, wherein the gain medium is optically pumped from at least one end using two semiconductor diode lasers combined by use of a polarizing beamsplitter.

16. A laser cavity of claim 1, wherein the gain medium comprises a rare earth element doped into a crystal host.

17. A laser cavity according to claim 16, wherein the gain medium comprises Neodymium doped into a crystal lattice.

18. A laser cavity according to claim 1, wherein one or more of the mirrors is concave.

19. A laser cavity according to claim 1, wherein the angle of incidence of light upon the fold mirror is greater than 20 degrees.

20. A laser cavity according to claim 1, wherein the angle of incidence of light upon the fold mirror is 40 degrees or greater.

21. A laser cavity according to claim 20, wherein the angle of incidence of light upon the told mirror is 50 degrees or greater.

22. A laser cavity according to claim 1, wherein the fold mirror is the component with the strongest polarization dependent loss in the laser cavity.

23. A laser cavity according to claim 22, wherein the difference in optical loss upon reflection for s-polarized light and p-polarized light at the fold mirror is between 1% and 3%

24. A laser cavity according to claim 1 wherein the difference in optical loss upon reflection for s-polarized light at the fold mirror is less than 3%.

25. A laser cavity according to claim 1, wherein the birefringent material is a crystal with crystallographic axes arranged at an angle relative to the polarization of light at the fundamental wavelength of the laser, and thereby forms part of the Lyot filter.

26. A laser cavity comprising a gain medium and first and second end mirrors, the gain medium including a birefringent material the laser cavity further comprising a fold mirror arranged to fold light propagating within the-laser cavity through a predetermined angle, wherein the predetermined angle is selected such that the reflectivity of the fold mirror is polarization dependent, and the birefringence of the birefringent material co-operates with the polarization dependent reflectivity of the fold mirror to form a Lyot filter which suppresses oscillation of unwanted laser modes, and wherein the majority of the effective gain provided by the gain medium is provided more than 5 mm away from the nearest end mirror.

27. A laser cavity comprising a gain medium and first and second end mirrors, wherein the laser cavity further comprises a birefringent material and a fold mirror arranged to fold light propagating within the laser cavity through a predetermined angle, wherein the predetermined angle is selected such that the reflectivity of the fold mirror is polarization dependent, and the birefringence of the birefringent material co-operates with the polarization dependent reflectivity of the fold mirror to form a Lyot filter which suppresses oscillation of unwanted laser modes, wherein the gain medium is distanced away from the nearest end mirror by a sufficient distance that the laser is allowed to oscillate at or near to several transmission peaks of the Lyot filter, and wherein the distance between the gain medium and the nearest end mirror is greater than 5 mm.

28. A laser cavity comprising a gain medium and first and second end mirrors, wherein the laser cavity further comprises a birefringent material and a fold mirror arranged to fold light propagating within the laser cavity through a predetermined angle, wherein the predetermined angle is selected such that the reflectivity of the fold mirror is polarization dependent, and the birefringence of the birefringent material co-operates with the polarization dependent reflectivity of the fold mirror to form a Lyot filter which suppresses oscillation of unwanted laser modes, wherein the gain medium is distanced away from the nearest end mirror by a sufficient distance that the laser is allowed to oscillate at or near to several transmission peaks of the Lyot filter and wherein the distance between the gain medium and the nearest end mirror is less than 5 mm, but the majority of the effective gain provided by the gain medium is provided more than 5 mm away from the nearest end mirror.

29. A laser cavity comprising a gain medium and first and second end mirrors, wherein the laser cavity further comprises a birefringent material and a fold mirror arranged to fold light propagating within the laser cavity through a predetermined angle, wherein the predetermined angle is selected such that the reflectivity of the fold mirror is polarization dependent, and the birefringence of the birefringent material co-operates with the polarization dependent reflectivity of the fold mirror to form a Lyot filter which suppresses oscillation of unwanted laser modes, and wherein in addition to the birefringent material the laser cavity is provided with a separate type I phasematched frequency doubling crystal.

30. A laser cavity comprising a gain medium and first and second end mirrors, wherein the laser cavity further comprises a birefringent material and a fold mirror arranged to fold light propagating within the laser cavity through a predetermined angle, wherein the predetermined angle is selected such that the reflectivity of the fold mirror is polarization dependent, and the birefringence of the birefringent material co-operates with the polarization dependent reflectivity of the fold mirror to form a Lyot filter which suppresses oscillation of unwanted laser modes, and wherein the angle of incidence of light upon the fold mirror is 40 degrees or greater.

31. A laser cavity according to claim 30, wherein the angle of incidence of light upon the fold mirror is 50 degrees or greater.

32. A laser cavity comprising a gain medium and first and second end mirrors, wherein the laser cavity further comprises a birefringent material and a fold mirror arranged to fold light propagating within the laser cavity through a predetermined angle, wherein the predetermined angle is selected such that the reflectivity of the fold mirror is polarization dependent, and the birefringence of the birefringent material co-operates with the polarization dependent reflectivity of the fold mirror to form a Lyot filter which suppresses oscillation of unwanted laser modes, and wherein the difference in optical loss upon reflection for s-polarized light at the fold mirror is less than 3%.

* * * * *